United States Patent
Park et al.

(10) Patent No.: US 9,412,034 B1
(45) Date of Patent: Aug. 9, 2016

(54) OCCLUSION HANDLING FOR COMPUTER VISION

(71) Applicant: QUALCOMM Incorporated, San Diego, CA (US)

(72) Inventors: Youngmin Park, Vienna (AT); Daniel Wagner, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/609,371

(22) Filed: Jan. 29, 2015

(51) Int. Cl.
*G06K 9/00* (2006.01)
*G06K 9/46* (2006.01)
*G06T 7/00* (2006.01)
*G06T 7/60* (2006.01)

(52) U.S. Cl.
CPC .............. *G06K 9/46* (2013.01); *G06K 9/00624* (2013.01); *G06T 7/0051* (2013.01); *G06T 7/60* (2013.01); *G06K 2009/4666* (2013.01); *G06T 2207/20021* (2013.01)

(58) Field of Classification Search
USPC .................................................. 382/106, 154
See application file for complete search history.

(56) References Cited

U.S. PATENT DOCUMENTS

| | | | | |
|---|---|---|---|---|
| 7,961,934 B2 * | 6/2011 | Thrun | ..................... | G01B 21/20 382/107 |
| 8,405,680 B1 | 3/2013 | Cardoso et al. | | |
| 8,619,082 B1 * | 12/2013 | Ciurea | ................ | H04N 13/0022 345/427 |
| 8,712,679 B1 * | 4/2014 | Mostofi | ................... | G09B 29/00 340/552 |
| 2004/0075654 A1 * | 4/2004 | Hsiao | ....................... | G06T 15/40 345/418 |
| 2004/0239670 A1 * | 12/2004 | Marks | ...................... | A63F 13/10 345/419 |
| 2005/0238200 A1 * | 10/2005 | Gupta | ................ | G06K 9/00201 382/103 |
| 2010/0208057 A1 * | 8/2010 | Meier | .................... | G06T 7/0046 348/135 |
| 2011/0026809 A1 * | 2/2011 | Jeong | .................... | G06T 7/0022 382/154 |
| 2012/0146998 A1 * | 6/2012 | Kim | ....................... | G06T 19/006 345/419 |
| 2012/0163672 A1 | 6/2012 | McKinnon | | |
| 2012/0206452 A1 | 8/2012 | Geisner et al. | | |
| 2012/0223956 A1 * | 9/2012 | Saito | ..................... | A45D 44/005 345/582 |
| 2013/0121559 A1 * | 5/2013 | Hu | ......................... | G06T 7/0075 382/154 |
| 2014/0176591 A1 * | 6/2014 | Klein | ..................... | G09G 3/003 345/589 |
| 2015/0086084 A1 * | 3/2015 | Falconer | ............ | G06K 9/00979 382/113 |
| 2015/0235410 A1 * | 8/2015 | Ha | .......................... | G06T 15/60 345/426 |
| 2016/0005213 A1 * | 1/2016 | Lecocq | ................... | G06T 15/60 345/419 |
| 2016/0125637 A1 * | 5/2016 | Hyllus | ................... | G06T 7/0051 382/154 |

OTHER PUBLICATIONS

Henry P., et al., "RGB-D Mapping: Using Depth Cameras for Dense 3D Modeling of Indoor Environments," Experimental Robotics: The 12th International Symposium on Experimental Robotics, 2014, pp. 477-491.

Tian Y., et al., "Real-Time Occlusion Handling in Augmented Reality Based on an Object Tracking Approach," Sensors, 2010, vol. 10, pp. 2885-2900.

* cited by examiner

*Primary Examiner* — John Strege
(74) *Attorney, Agent, or Firm* — Blakely Sokoloff Taylor & Zafman LLP

(57) ABSTRACT

Disclosed are a system, apparatus, and method for performing occlusion handling for simultaneous localization and mapping. Occluded map points may be detected according to a depth-mask created according to an image keyframe. Dividing a scene into sections may optimize the depth-mask. Size of depth-mask points may be adjusted according to intensity. Visibility may be verified with an optimized subset of possible map points. Visibility may be propagated to nearby points in response to determining an initial visibility of a first point's surrounding image patch. Visibility may also be organized and optimized according to a grid.

28 Claims, 12 Drawing Sheets

PROJECT MAP POINTS OBSERVABLE FROM A 3D MAP TO A KEYFRAME'S POINTS, WHERE THE KEYFRAME COMPRISES AN IMAGE WITH AN ASSOCIATED CAMERA VIEWPOINT
305

CREATE, FROM EACH OF THE KEYFRAME'S POINTS, A DEPTH MAP COMPRISING A PLURALITY OF DEPTH MAP POINTS, WHERE EACH DEPTH MAP POINT COMPRISES A VALUE REPRESENTING A DISTANCE FROM THE KEYFRAME'S ASSOCIATED CAMERA VIEWPOINT TO A RESPECTIVE MAP POINT FROM THE 3D MAP, AND WHERE IF A DEPTH MAP POINT REPRESENTS A PLURALITY OF RESPECTIVE MAP POINT DISTANCES, THE VALUE COMPRISES A SMALLEST OF THE PLURALITY OF RESPECTIVE MAP POINT DISTANCES
310

IDENTIFY POTENTIALLY VISIBLE POINTS IN THE KEYFRAME, THE POTENTIALLY VISIBLE POINTS COMPRISING THE KEYFRAME'S POINTS HAVING A REPRESENTATIVE DISTANCE WITHIN THE DEPTH MAP
315

SELECT A PLURALITY OF THE POTENTIALLY VISIBLE POINTS TO TEST FOR VISIBILITY IN THE IMAGE
320

TEST THE SELECTED PLURALITY OF THE POTENTIALLY VISIBLE POINTS FOR VISIBILITY, WHERE THE TESTING COMPRISES DETERMINING WHETHER EACH OF THE PLURALITY OF THE POTENTIALLY VISIBLE POINTS COMPRISES A SURROUNDING IMAGE PATCH FROM THE KEYFRAME THAT CORRESPONDS TO AN IMAGE PATCH FROM THE 3D MAP
325

MAP AN ENVIRONMENT ACCORDING TO RESULTS FROM THE TEST FOR VISIBILITY
330

FIG. 3

OCCLUSION HANDLING FOR COMPUTER VISION

FIELD

The subject matter disclosed herein relates generally to occluded objects and environment detection in computer vision.

BACKGROUND

Computer vision is a field that includes methods and systems for acquiring, analyzing, processing, and understanding images (e.g., real world image captures) to provide an event or result. For example, one computer vision technique is Simultaneous Localization and Mapping (SLAM), which can process the input of a single camera and continuously build up a three dimensional (3D) model (e.g., reconstructed map) of an environment as the camera moves in Six Degrees of Freedom (6DOF). SLAM systems can simultaneously track the pose of the camera with respect to the 3D model while mapping the 3D model. However, when a new (un-mapped) object occludes an existing 3D model, SLAM systems may produce errors as the SLAM system attempts to track the pre-existing/reconstructed 3D model behind the new occluding object. Errors can occur when the SLAM system attempts to track features of the 3D model because the features occluded by the new object can no longer be tracked by the SLAM system. In some cases, occlusion errors cause SLAM systems to fail in tracking the 3D model and the occluding object is not reconstructed.

Eliminating the tracking errors that occur from the new object occlusion typically requires extensive processing of the scene beyond what may be possible in real time on certain devices (e.g., limited processing capability portable or mobile devices). For example, detecting occluding objects typically requires verifying visibility of every map point in the camera's field of view. This extensive visibility verification involves searching for correspondence of every reconstructed map point to every point in a current camera image. Therefore, new and improved occlusion handling for computer vision is desirable.

BRIEF DESCRIPTION OF THE DRAWINGS

FIG. 3 illustrates a flow diagram of a method for performing OHCV, in one embodiment;

SUMMARY OF THE DESCRIPTION

Figure 1:
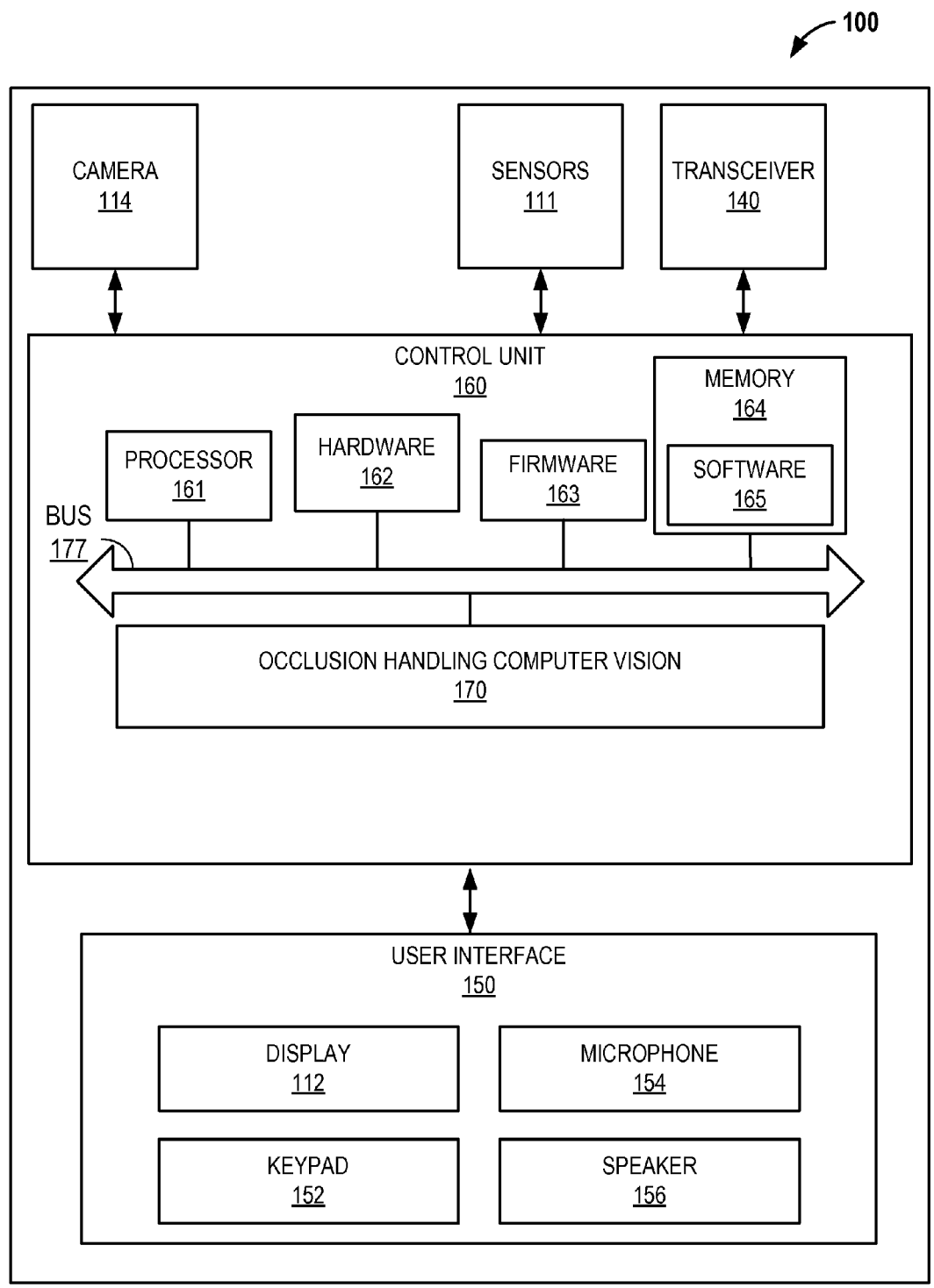
FIG. 1 is a block diagram of a system in which aspects of Occlusion Handling for Computer Vision (OHCV) may be practiced, in one embodiment.

Embodiments disclosed herein may relate to a method to perform occlusion handling for computer vision. The method may include projecting map points observable from a 3D map to points of a keyframe, where the keyframe comprises an image with an associated camera viewpoint. The method may also include creating, from each of the points of the keyframe, a depth map comprising a plurality of depth map points, where each depth map point comprises a value representing a distance from the keyframe's associated camera viewpoint to a respective map point from the 3D map, and if a depth map point represents a plurality of respective map point distances, the value comprises a smallest of the plurality of respective map point distances. The method may also include identifying potentially visible points in the keyframe, the potentially visible points comprising the points of the keyframe having a representative distance within the depth map and selecting a plurality of the potentially visible points to test for visibility in the image. The method may also include testing the selected plurality of the potentially visible points for visibility, where the testing comprises determining whether each of the plurality of the potentially visible points comprises a surrounding image patch from the keyframe that corresponds to an image patch from the 3D map and mapping an environment according to results from the testing for visibility.

Embodiments disclosed herein may further relate to a device to perform occlusion handling for computer vision. The device may include instructions to project map points observable from a 3D map to the points of a keyframe, where the keyframe comprises an image with an associated camera viewpoint. The device may include instructions to create, from each of the points of the keyframe, a depth map comprising a plurality of depth map points, where each depth map point comprises a value representing a distance from the keyframe's associated camera viewpoint to a respective map point from the 3D map, and if a depth map point represents a plurality of respective map point distances, the value comprises a smallest of the plurality of respective map point distances. The device may include instructions to identify potentially visible points in the keyframe, the potentially visible points comprising the points of the keyframe points having a representative distance within the depth map and select a plurality of the potentially visible points to test for visibility in the image. The device may include instructions to test the selected plurality of the potentially visible points for visibility, where the test comprises determining whether each of the plurality of the potentially visible points comprises a surrounding image patch from the keyframe that corresponds to an image patch from the 3D map and map an environment according to results from the testing for visibility.

Embodiments disclosed herein may also relate to an apparatus to perform occlusion handling for computer vision. The apparatus may include means for projecting map points observable from a 3D map to points of a keyframe, where the keyframe comprises an image with an associated camera viewpoint. The apparatus may include means for creating, from each of the points of the keyframe, a depth map comprising a plurality of depth map points, where each depth map point comprises a value representing a distance from the keyframe's associated camera viewpoint to a respective map point from the 3D map, and if a depth map point represents a plurality of respective map point distances, the value comprises a smallest of the plurality of respective map point distances. The apparatus may include means for identifying potentially visible points in the keyframe, the potentially visible points comprising the points of the keyframe having a representative distance within the depth map and means for selecting a plurality of the potentially visible points to test for visibility in the image. The apparatus may include means for testing the selected plurality of the potentially visible points for visibility, where the testing comprises determining whether each of the plurality of the potentially visible points comprises a surrounding image patch from the keyframe that corresponds to an image patch from the 3D map and means for mapping an environment according to results from the testing for visibility.

Embodiments disclosed herein may further relate to an article comprising a non-transitory storage medium with instructions that are executable to perform occlusion handling for computer vision. The medium may include instructions to project map points observable from a 3D map to points of a keyframe, where the keyframe comprises an image with an associated camera viewpoint. The medium may include instructions to create, from each of the points of the keyframe, a depth map comprising a plurality of depth map points, where each depth map point comprises a value representing a distance from the keyframe's associated camera viewpoint to a respective map point from the 3D map, and if a depth map point represents a plurality of respective map point distances, the value comprises a smallest of the plurality of respective map point distances. The medium may include instructions to identify potentially visible points in the keyframe, the potentially visible points comprising the points of the keyframe having a representative distance within the depth map and select a plurality of the potentially visible points to test for visibility in the image. The medium may include instructions to test the selected plurality of the potentially visible points for visibility, where the test comprises determining whether each of the plurality of the potentially visible points comprises a surrounding image patch from the keyframe that corresponds to an image patch from the 3D map and map an environment according to results from the testing for visibility.

Other features and advantages will be apparent from the accompanying drawings and from the detailed description.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

In one embodiment, Occlusion Handling for Computer Vision (described herein as "OHCV") filters occluded map points with a depth-map and determines visibility of a subset of points. 3D points in a 3D map have a known depth value (e.g., as a result of Simultaneous Localization and Mapping (SLAM) or other mapping method). In one embodiment, OHCV compares depth of 3D points to depths for equivalent points (e.g., points occupying a same position relative to the camera viewpoint) in a depth mask/map. In response to comparing two or more equivalent points, points with a greater depth (e.g., points farther away from the camera position) are classified as occluded. Points without a corresponding depth in the depth mask are processed through an optimized visibility test.

In some embodiments, OHCV sets each point's size within the depth map relative to a respective depth value of the point. For example, points closest to the camera viewpoint are represented in the depth map with a larger coverage area (e.g., as circles with greater circumference than points farther away from the camera viewpoint).

In one embodiment, point visibility relative to the camera viewpoint is verified for a subset of the non-occluded points remaining after pre-filtering with the depth map. Point visibility is verified to catch 3D map points remaining after depth map pre-filtering that might be occluded by another unknown (i.e., not yet reconstructed) object.

FIG. 1 is a block diagram illustrating a system in which embodiments of the invention may be practiced. The system may be a device (e.g., device 100), which may include a general purpose processor 161, and a memory 164. Device 100 may also include a number of device sensors coupled to one or more buses 177 or signal lines further coupled to OHCV 170 implemented as a module or engine. As illustrated in FIG. 1, OHCV 170 is separate from processor 161 and/or hardware 162 for clarity, but may be combined and/or implemented in the processor 161 and/or hardware 162. In some embodiments, features of OHCV 170 are implemented by instructions in software 165 and/or firmware 163. In some embodiments, control unit 160 is configured to implement methods of performing OHCV. For example, the control unit 160 can be configured to implement functions of the device 100 as described below with regards to FIG. 3, FIG. 4, and FIG. 5.

Device 100 may be a: mobile device, wireless device, cell phone, augmented reality device (AR), personal digital assistant, wearable device (e.g., eyeglasses, watch, head wear, or similar bodily attached device), mobile computer, tablet, personal computer, laptop computer, data processing device/system, or any type of device that has processing capabilities.

In one embodiment, device 100 is a mobile/portable platform. Device 100 can include a means for capturing an image, such as camera 114, and may optionally include sensors 111, such as accelerometers, gyroscopes, electronic compass, or other similar motion sensing elements.

Device 100 may comprise multiple cameras, such as dual front cameras and/or a front and rear-facing cameras, which may also incorporate various sensors. Cameras may be capable of capturing both still and video images. Cameras may be Red Green Blue plus Depth (RGBD) or stereoscopic video cameras capable of capturing images at 30 frames per second (fps). Images captured by cameras may be in a raw uncompressed format and may be compressed prior to being processed and/or stored in memory 164. OHCV may perform image compression with processor 161 using lossless or lossy compression techniques.

Processor 161 may also receive input from sensors 111. Sensors 111 may comprise 3-axis accelerometer(s), 3-axis gyroscope(s), and/or magnetometer(s). Sensors 111 may provide velocity, orientation, and/or other position related information to processor 161. Sensors 111 may output measured information associated with the capture of each image frame by camera 114. The output of sensors 111 may be used in part by processor 161 to determine a pose of camera 114 and/or device 100.

The pose of camera 114 (also described herein as "camera viewpoint") refers to the position and orientation (i.e., pose) of the camera 114 relative to a frame of reference. Camera pose may be determined for 6DOF, which refers to three translation components (which may be given by X, Y, Z coordinates of a frame of reference) and three angular components (e.g. roll, pitch, and yaw relative to the same frame of reference).

The pose of camera 114 and/or device 100 may be determined and/or tracked by processor 161 using a visual tracking solution based on images captured by camera 114. For example, a mapping module running on processor 161 may implement and execute computer vision based tracking, model-based tracking, and/or Simultaneous Localization And Mapping (SLAM) methods. SLAM refers to a class of techniques where a 3D map of an environment, such as a 3D map of an environment being modeled by device 100, is created while simultaneously tracking the camera's pose relative to that map. The methods implemented by SLAM module 173 may be based on color or grayscale image data captured by camera 114 and may be used to generate estimates of 6DOF pose measurements of the camera. Output of sensors 111 may be used to estimate, correct, and/or otherwise adjust the estimated pose. Images captured by camera 114 may be used to recalibrate or perform bias adjustments for sensors 111.

The device 100 may further include a user interface 150 that includes a means for displaying an augmented reality image, such as the display 112. The user interface 150 may also include a keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, e.g., if the device 100 is a mobile platform such as a cellular telephone. Device 100 may include other elements unrelated to the present disclosure, such as a satellite position system receiver, power device (e.g., a battery), as well as other components typically associated with portable and non-portable electronic devices.

The device 100 may function as a mobile or wireless device and may communicate via one or more wireless communication links through a wireless network that are based on or otherwise support any suitable wireless communication technology. For example, in some aspects, the device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

As described above, the device 100 can be a portable electronic device (e.g., smart phone, dedicated augmented reality (AR) device, game device, or other device with AR processing and display capabilities). The device implementing the AR system described herein may be used in a variety of environments (e.g., shopping malls, streets, offices, homes or anywhere a user carries their portable device). Users can interface with multiple features of their device 100 in a wide variety of situations. In an AR context, a user may use their device to view a representation of the real world through the display of their device. A user may interact with their AR capable device by using their device's camera to receive real world images/video and process the images in a way that superimposes additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

In one embodiment, OHCV creates the 3D map from techniques such as SLAM. For example, SLAM (e.g., 6 Degrees of Freedom (6DOF) tracking and mapping) can associate features observed from keyframes to the 3D map and use the feature point associations to determine the camera pose related to a respective camera image. Through 6DOF mapping, OHCV may update/maintain the 3D map with new or additional object and environment reconstructions. For example, in response to detecting occluded objects within a keyframe, OHCV can trigger reconstruction of objects and/or mapping of new objects within the keyframe. Newly discovered objects may be incorporated into the 3D map. The 3D map may contain 3D feature points triangulated from two or more keyframes. For example, keyframes may be selected from an image or video stream or feed to represent an observed scene. For keyframes, OHCV can compute a respective 6DOF camera pose associated with the image. OHCV can determine camera pose by projecting features from the 3D map into an image or video frame and updating the camera pose from verified 2D-3D correspondences.

Figure 2A:
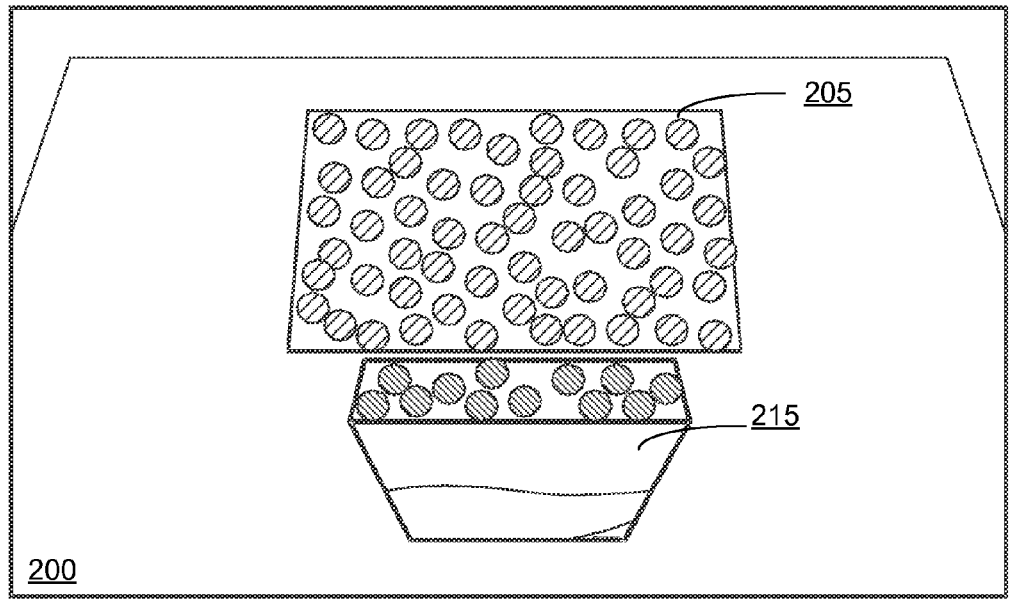
FIG. 2A illustrates a first keyframe with a first viewpoint and a three-dimensional (3D) map, in one embodiment.

FIG. 2A illustrates a first keyframe with a first viewpoint and a 3D map, in one embodiment. For example, the illustrated keyframe may be a first keyframe ($K_{i-1}$) with first viewpoint ($V_{i-1}$) captured at time $T_{i-1}$. FIG. 2A further illustrates objects (e.g., object 205 and object 215), which represent fully or partially reconstructed objects within a SLAM system (e.g., 3D map) at time $T_{i-1}$. For example, object 205 may be previously reconstructed by the SLAM system at time T0 before time $T_{i-1}$. FIG. 2A further illustrates a potentially occluding object (e.g., object 215) which represents a partially reconstructed object within the environment 200 at time $T_{i-1}$. For example, at time $T_{i-1}$ illustrated in FIG. 2A, the SLAM system has yet to fully reconstruct the potentially occluding object, or the object may have limited/partial reconstruction due to the angle of viewpoint providing limited information for the object while mapping the environment. In some embodiments, the viewpoint may include entirely unreconstructed objects (e.g., no limited or partially reconstructed objects are present).

Figure 2B:
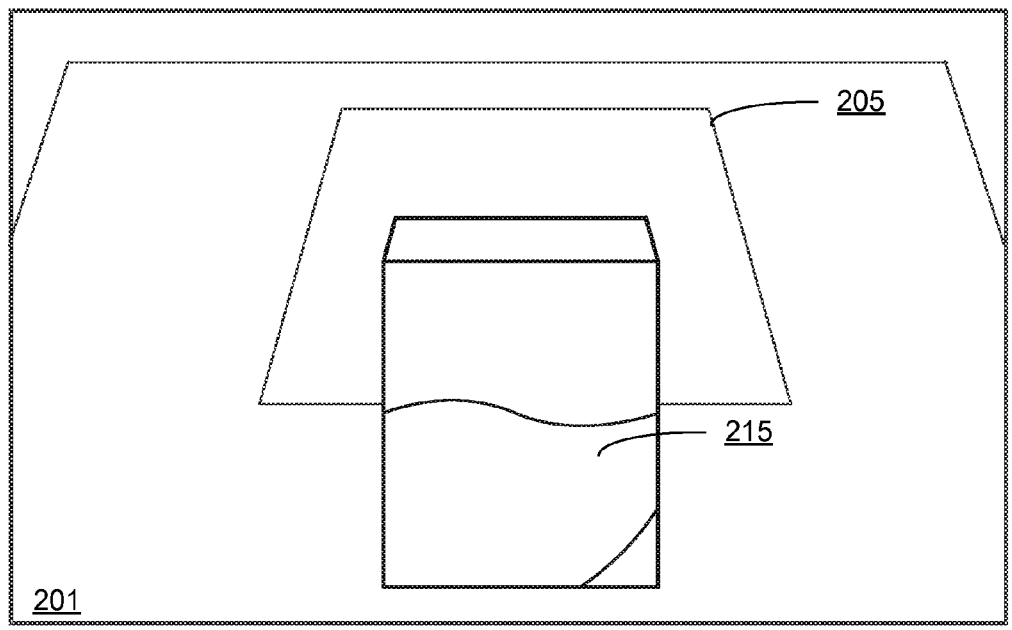
FIG. 2B illustrates a second keyframe with a second viewpoint, in one embodiment.

FIG. 2B illustrates a second keyframe with a second viewpoint, in one embodiment. For example, FIG. 2B may illustrate a second keyframe ($K_i$) with viewpoint $V_i$ captured at time $T_1$ (e.g., $T_1$ may be after time $T_{i-1}$ associated with FIG. 2A). OHCV may read the keyframe $K_i$ and extract new image points in the keyframe $K_i$ while avoiding overlap with already reconstructed map points. FIG. 2B illustrates a camera viewpoint has shifted lower at $T_1$ from the higher view of FIG. 2A at time $T_{i-1}$. As illustrated in FIG. 2B, object 215 is now at least partially occluding a reconstructed portion of the 3D map (e.g., object 205). As in FIG. 2A at time $T_{i-1}$, the SLAM system has yet to fully reconstruct the occluding object at time $T_1$.

Figure 2C:
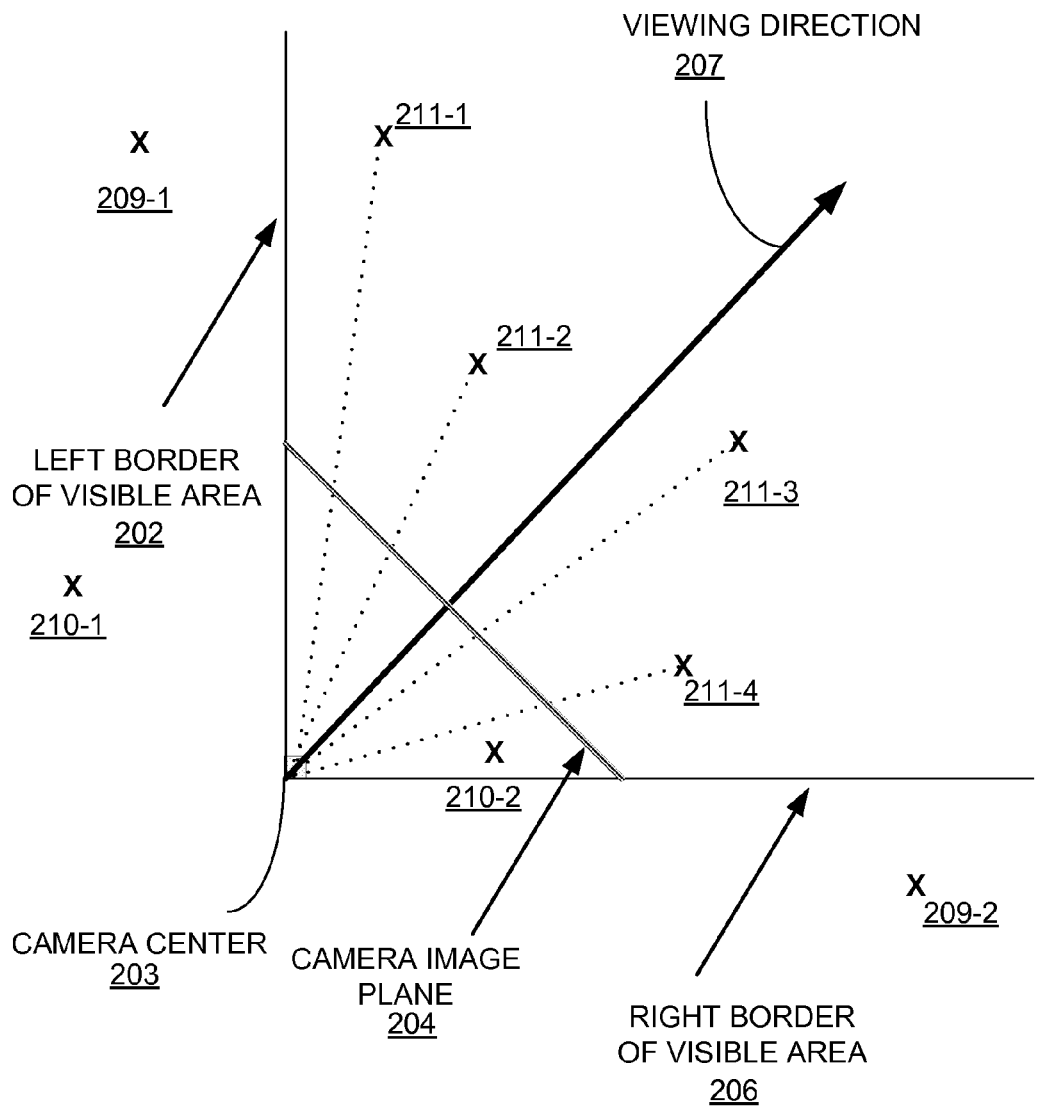
FIG. 2C illustrates a representation of map points in a camera view, in one embodiment.

FIG. 2C illustrates a representation of map points in a camera view, in one embodiment. FIG. 2C illustrates which points are observable from a camera view (e.g., from camera center 203 along viewing direction 207). Points 211-1 to 211-4 project into the camera image plane 204. In contrast, points 209-1 to 209-2 lie outside of the visible area (e.g., left border 202 and right border 206). Points 210-1 to 210-2 lie behind the camera (e.g., behind camera image plane 204).

Figure 2D:
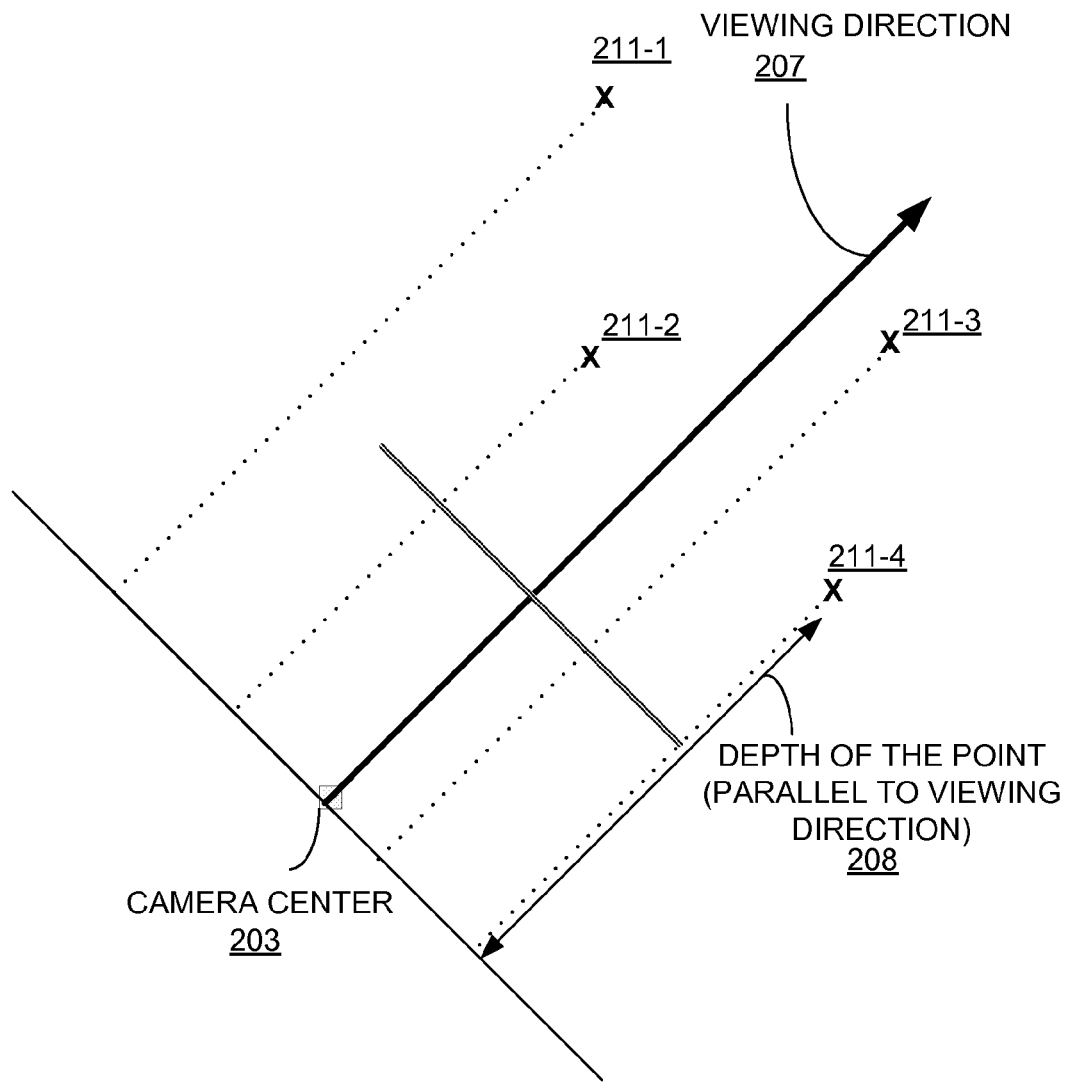
FIG. 2D illustrates the map points of FIG. 2C with their relative depth to a camera image plane, in one embodiment.

FIG. 2D illustrates the map points of FIG. 2C with their relative depth to a camera image plane, in one embodiment. Depth 208 is illustrated and described herein as the distance of an observable point in the viewing direction (e.g., direction 207) of the camera. Depth may be calculated according to a known camera position and orientation.

Figure 2E:
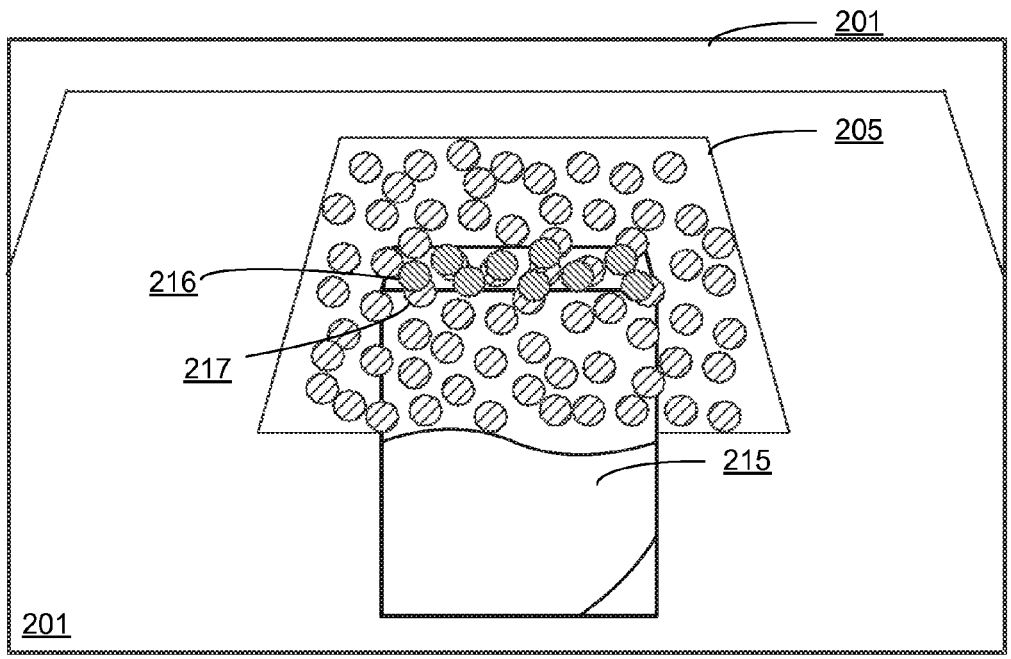
FIG. 2E illustrates a 3D map associated with the environment of FIG. 2B, in one embodiment.

FIG. 2E illustrates a 3D map associated with the environment of FIG. 2B at time $T_1$. FIG. 2E illustrates environment 201 containing reconstructed object 205 with points (e.g., reference 3D map points 210) that may be leveraged by a SLAM system for tracking of the reconstructed object 205. FIG. 2E illustrates a subset of keyframe points $KP_i$ that could be observed within the view frustum (i.e., sight) of the camera. In one embodiment, the unreconstructed object 215 is not represented within the 3D map of the environment because the object 215 is initially undiscovered at time $T_1$ and has not been reconstructed within the 3D map of the SLAM system. In some embodiments, because the occluding object is only partially reconstructed, some areas of the object are essentially unknown to the SLAM system (e.g., the front section of object 215 is unrepresented by any 3D points). FIG. 2E also illustrates that some 3D points are occluded. For example, point 216 associated with the top of the object 215 occludes point 217 associated with object 205.

Figure 2F:
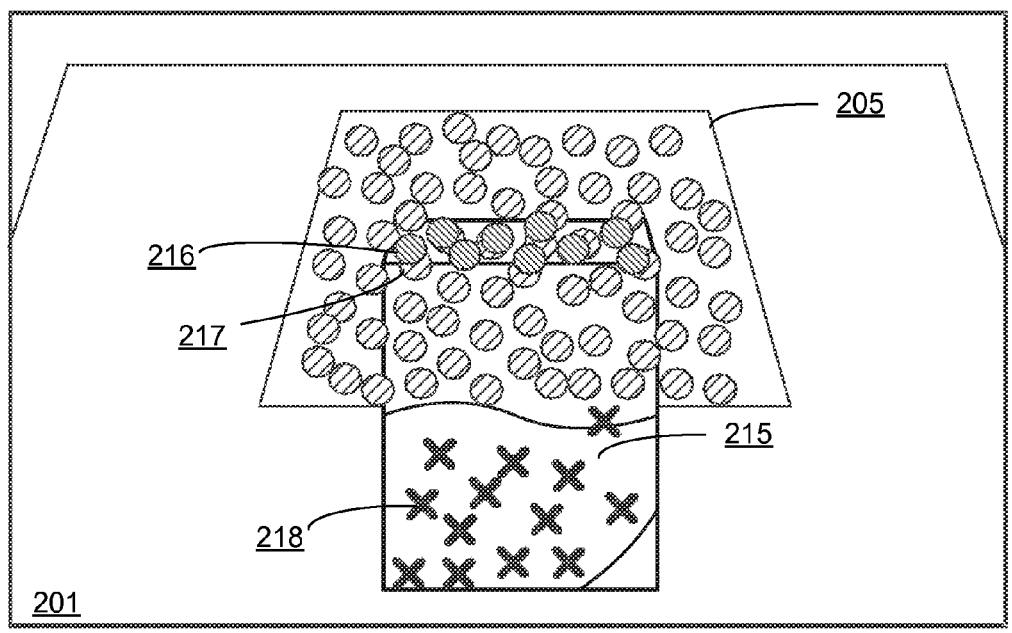
FIG. 2F illustrates new image point extraction without consideration of occlusions, in one embodiment.

FIG. 2F illustrates new image point reconstruction without consideration of occlusions. For example, as illustrated in FIG. 2F, the SLAM system is unaware (e.g., has not determined) of the overlap with invisible map points. As will be shown below, OHCV can detect occlusions from a depth map comparison in order to reduce the number of visibility test to perform within an input keyframe. In some embodiments, in addition to or instead of performing the depth map comparison, OHCV utilizes visibility testing estimation and propagation techniques as described in greater detail with regards to FIG. 3 and FIG. 5 below.

Figure 2G:
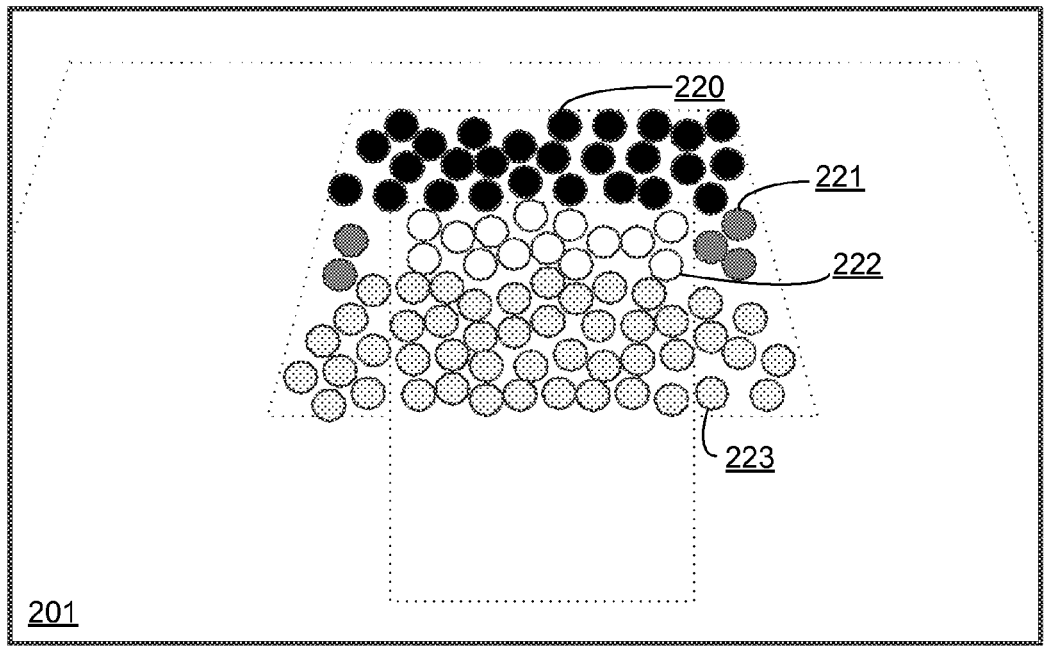
FIG. 2G illustrates a depth map for the scene of FIG. 2B, in one embodiment.

FIG. 2G illustrates a depth map for the scene of FIG. 2B, in one embodiment. For example, depth map $D_i$ may represent the distance of all points of $KP_i$. In one embodiment, depth map $D_i$ contains data points representing depth values from the camera viewpoint to a physical area within the scene or environment. For example, points 220, 221, 222, and 223 may indicate a depth value (e.g., inches, centimeters, or other measurement of distance) from the camera viewpoint to the respective position on object 215. As illustrated in FIG. 2E, point 220 has the greatest intensity (e.g., almost black) and is farthest from the camera viewpoint. Point 221 represents a point closer to the camera viewpoint than point 220, however not as close as point 223. Point 222 represents low intensity depth value indicating a relatively close point to the camera viewpoint. As illustrated in FIG. 2E, point 222 and the other points at the top section of object 205 are closest to the camera viewpoint.

Figure 2H:
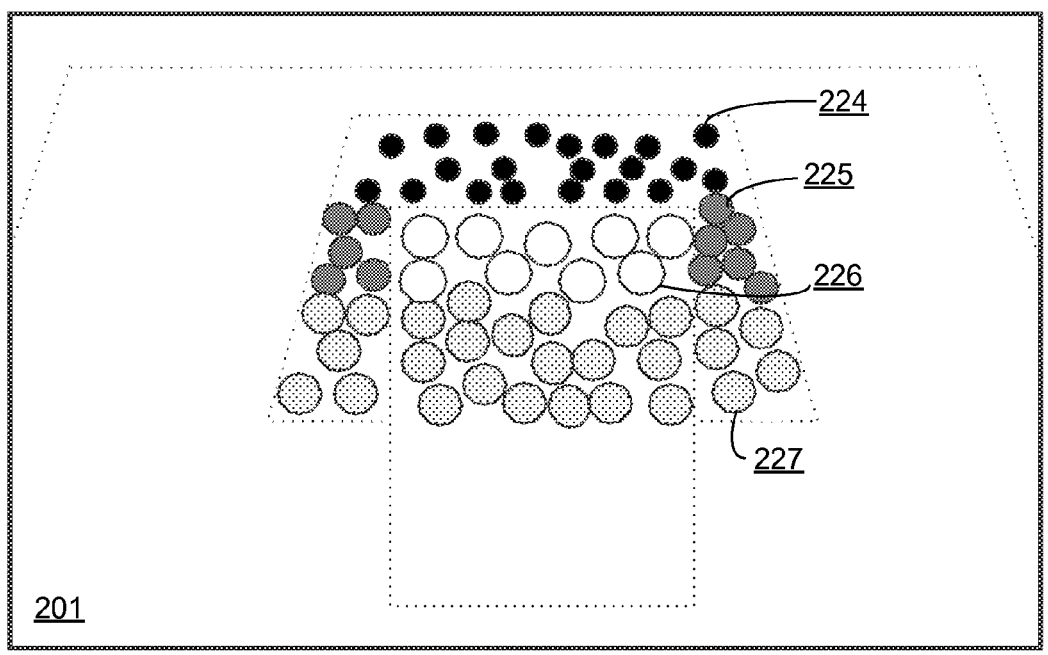
FIG. 2H illustrates a mask representing depth values for points in the environment illustrated in FIG. 2B, in another embodiment.

FIG. 2H illustrates a mask representing depth values for points in the environment illustrated in FIG. 2B, in another embodiment. For example, points in a mask representing depth values may be drawn larger (e.g., point 226) or smaller (e.g., point 224) relative to their respective depth values. Closer points (e.g., points 226, and points 227 for object 215) may be drawn larger relative to (smaller) points farther from the camera viewpoint (e.g., points 224 and points 225).

Figure 2I:
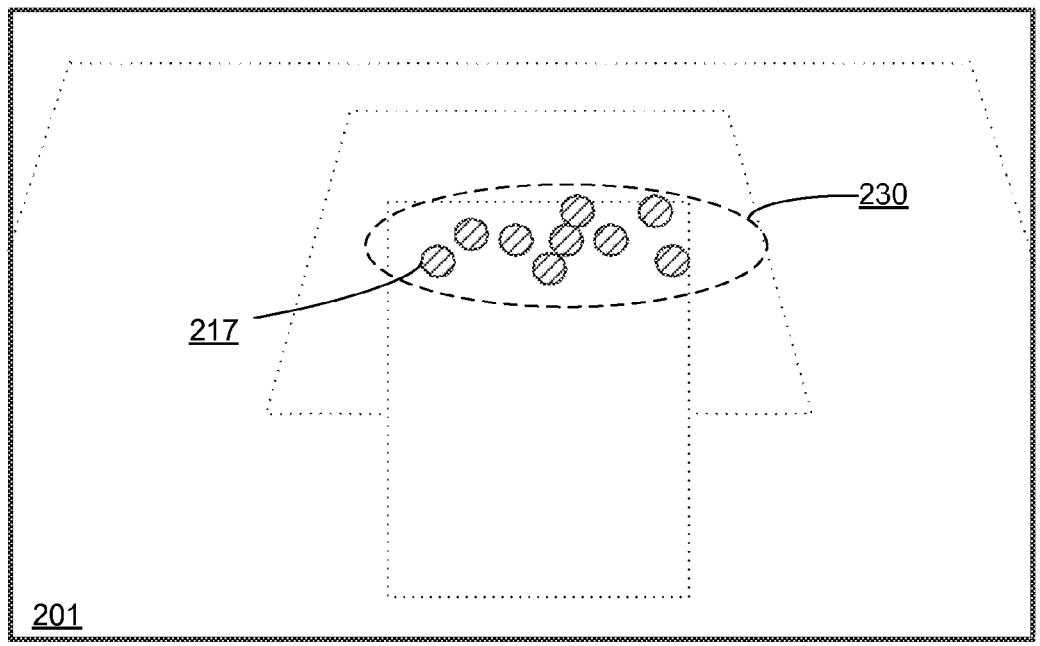
FIG. 2I illustrates occluded points determined from performing depth map comparison, in one embodiment.

FIG. 2I illustrates occluded points determined from performing depth map comparison, in one embodiment. For example, FIG. 2G may represent occluded points $O_i$ (e.g., points 230) without a corresponding pixel in Di. As illustrated in FIG. 2G, points $O_i$ are occluded by other map points (e.g., 0=KP−PV). For example, FIG. 2G includes point 217 occluded by point 216 as illustrated by FIG. 2E.

Figure 2J:
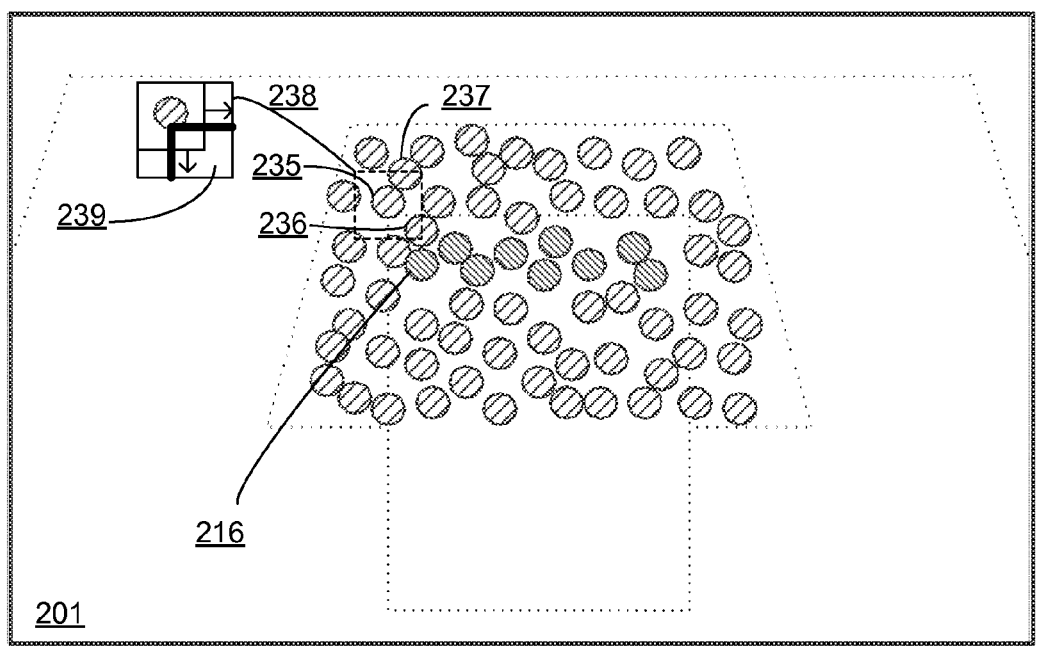
FIG. 2J illustrates potentially visible points in the scene of FIG. 2B, in one embodiment.

FIG. 2J illustrates potentially visible points in the scene of FIG. 2B, in one embodiment. For example, the potentially visible points PV, illustrated in FIG. 2I are determined as not occluded by other map points within the 3D map. In response to removing, ignoring, or discarding the occluded points illustrated in FIG. 2G, OHCV may visibility test the resulting potentially visible points. FIG. 2J further illustrates an image patch 238 around a map point 235 that may be used to test for visibility. For example, image patch 238 around a map point 235 in the 3D map may be warped or transformed to match the appearance of the image of a current keyframe. OHCV may compute a Normalized Cross-Correlation (NCC) over a search region 239 around the expected position of the map point. If a correspondence is found (e.g., a position has high NCC), the map point (e.g., point 235) is considered visible. Points within a threshold radius from selected point 235 (e.g., points 236, and 237) are likely to share visibility characteristics because they share pixels for image patch 238 around point 235. For example, the top left edge of the object (box) 215 is illustrated as included in image patch 238 and may be a useful visual identifier/marker when matching the image patch from the keyframe to a respective image patch from a 3D map. In some embodiments, when performing a visibility test for points within a keyframe, OHCV subdivides the keyframe into sections or a grid to arrange testing for groups of point correspondences as illustrated in FIG. 2K discussed below.

Figure 2K:
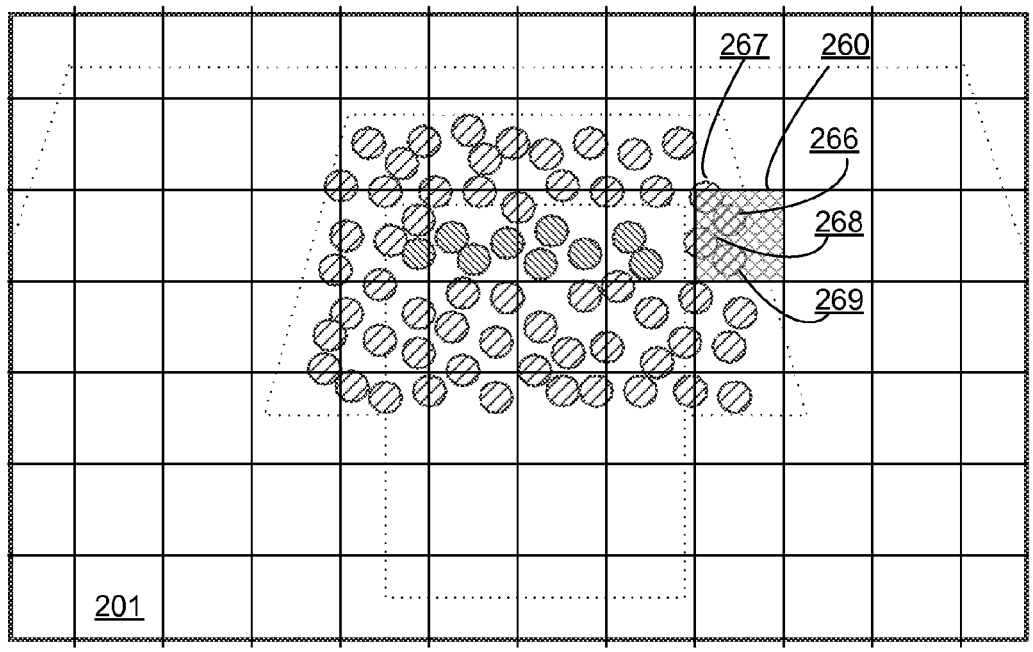
FIG. 2K illustrates selecting points within the scene illustrated in FIG. 2B for processing with a visibility test, in another embodiment.

FIG. 2K illustrates selecting points within the scene illustrated in FIG. 2B for processing with a visibility test, in another embodiment. In one embodiment, OHCV utilizes sections/grids and visibility test result propagation to optimize the process of determining visibility for points in a keyframe. OHCV can subdivide a keyframe into separate parts/sections. In one embodiment, OHCV subdivides keyframes with a grid of equally sized boxes or rectangles (e.g., grid section 260), however other configurations, shapes, or sizes may be possible as well. In one embodiment, OHCV's configuration settings for sections/grids is dependent upon the processing capabilities of the particular device performing OHCV. For example, grid section 260 illustrated in FIG. 2K includes four points 266-269 with unknown visibility.

In response to selecting a particular section/grid configuration (e.g., according to configurable settings for size and number of sections) point correspondences between the keyframe and the 3D map may be determined. In some embodiments, OHCV compares points within a subsection of each grid section to one or more other points within the same grid section. OHCV can propagate the results of the comparison from one or more points to other nearby or adjacent points. For example, within grid section 260 illustrated in FIG. 2K, OHCV may be configured to test for one or more point correspondences. In one embodiment, instead of testing every point (which may be a processing intensive process), OHCV skips/bypasses visibility testing for a subset of points when the number of tested points meets or exceeds a threshold (i.e., a threshold number of tested points). OHCV may estimate or infer the visibility value/status of remaining untested points by inferring the value/status of each point is the same or similar to a nearby or adjacent point. OHCV tests for a subset of one or more points and propagates the result to other adjacent or nearby points within each grid section. In the example grid illustrated in FIG. 2K, of the four points 266-269 within the grid section 260, one to three points may be explicitly tested for visibility, and the results for each point may be duplicated, extended, or copied, to one or more of the nearby or adjacent points. For example, in response to determining point 266 is visible according to a visibility test, OHCV can propagate the visibility result to adjacent points 267, 268, and 269. Therefore, although only point 266 was explicitly tested for visibility, all four points 266-269 in the grid section 260 will be assigned a visibility test value/result that is the same or similar to 266 after propagation of the result of point 266.

In one embodiment, OHCV leverages one or more of: the number of the test sections, size of the test sections, or the threshold number of points, as tuning parameters to adapt to a given process power of a system or hardware performing OHCV. For example, on a relatively low processing capability device (e.g., a low end mobile device) OHCV may propagate more visibility values compared to a higher performance device (e.g., a flagship or cutting edge mobile device). In some embodiments, OHCV may also refer to a reliability configuration setting that specifies a threshold number of visibility values to propagate and/or a grid arrangement setting.

Figure 2L:
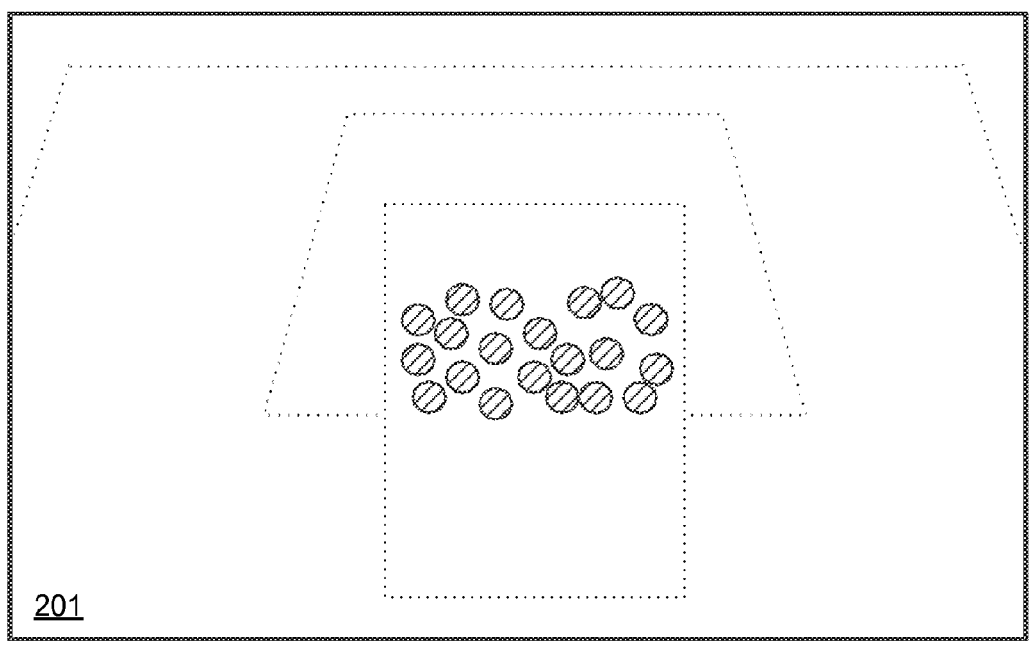
FIG. 2L illustrates occluded points discovered by the visibility test.

FIG. 2L illustrates occluding points discovered by the visibility test, in one embodiment. For example, in addition to the occluding points found from the depth map, the visibility test can discover the remaining occluding points within the keyframe. As illustrated in FIG. 2L, the occluded points are the non-reconstructed section of the box in front of object 205.

Figure 2M:
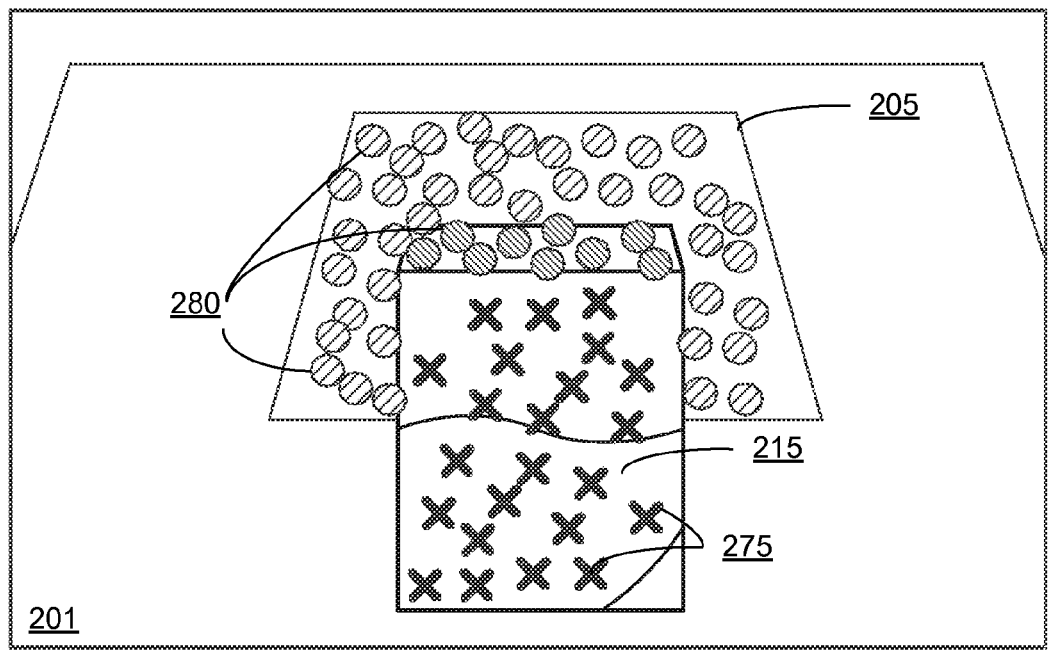
FIG. 2M illustrates new image points to be extracted from the input keyframe, in one embodiment.

FIG. 2M illustrates new image points to be extracted from the input keyframe, in one embodiment. OHCV can avoid extraction of the final visible map points 280 and extract points 275 from the front side of the box. In contrast to FIG. 2H, OHCV has been able to correctly detect the visible map points such that reconstruction can avoid overlap with invisible map points (e.g., at areas covered by object 205).

FIG. 3 illustrates a flow diagram of Occlusion Handling for Computer Vision, in one embodiment. At block 305, an embodiment (e.g., OHCV) projects map points observable from a 3D map to a keyframe's points, wherein the keyframe comprises an image with an associated camera viewpoint.

From 3D points in the 3D map and the position of a camera (e.g., keyframe viewpoint), projection includes the calculation for where the 3D points show up in the camera image (e.g., the 2D locations of the 3D points in the camera/keyframe image). The process of projection may include transforming the 3D point from 3D world coordinates into 3D camera coordinates, then projecting into 2D camera space and then transforming into 2D pixel space. For example, a formula may be $m_i = K*P(T*M_i)$ where $M_i$ is a point in 3D, T is the camera/keyframe pose matrix, P( ) is the projection function taking a 3D point and dividing by the z-coordinate thereby resulting in a 2D point, K is the camera/keyframe calibration matrix and $m_i$ is the 2D pixel coordinate of $M_i$ in the camera/keyframe image.

In some embodiments, in response to or as part of projecting the 3D map points, OHCV determines which keyframe points are observable from the camera viewpoint to the 3D map (for example, points 211-1 to 211-4, as illustrated in FIGS. 2C and 2D). For example, all 3D map points may not be observable from a current camera viewpoint because they are not within the frame (for example, points 209-1 to 209-2, as illustrated in FIGS. 2C and 2D).

The keyframe may include 3D points (e.g., points with coordinates in three dimensional space) detected within an image. For example, the keyframe may be determined by processing a camera image to detect one or more feature points within the image. In one embodiment, OHCV obtains a three-dimensional (3D) map (also referred to as a reference map) of an environment that includes 3D map points associated with one or more objects in the environment. For example, the 3D map may be a reconstructed map from SLAM or other computer vision mapping system. The reference/reconstructed map may be stored and retrieved locally (e.g., in memory 164 of device 100). In some embodiments, the 3D map is received/retrieved from a server or external/remote device.

At block 310, the embodiment creates, from each of the keyframe's points, a depth map comprising a plurality of depth map points, wherein each depth map point comprises a value representing a distance from the keyframe's associated camera viewpoint to a respective map point from the 3D map, and wherein if a depth map point represents a plurality of respective map point distances, the value comprises a smallest of the plurality of respective map point distances. For example, OHCV may create a depth image in which the 3D map points are represented as small circles with intensity of the circles representing distance from the camera viewpoint to the point within an environment. Occluded map points may be detected by comparing a 3D map point's distance and the depth from the depth map. For example, keyframe points observable from the camera viewpoint projected onto a same 3D map point and a respective 3D map distance closest to the camera viewpoint is stored in the depth map. As a result of comparing distance between two points, a keyframe point associated with a farther distance (e.g., largest distance) from a camera viewpoint is determined as occluded. Depth map filtering is described in additional detail with regard to FIG. 4 below.

In some embodiments, creating the depth map also includes subdividing the keyframe into sections, where a threshold number of points with depth values are allocated to each of the sections. Furthermore, the size of each depth point may be determined relative to the value of the point. For example, closer points (smaller distance values) may be drawn larger than farther points (larger distance values).

At block 315, the embodiment identifies potentially visible points in the keyframe, the potentially visible points comprising the keyframe's points having a representative distance within the depth map. For example, OHCV can use the result of the depth comparison to identify occluded map points.

At block 320, the embodiment selects a plurality of the potentially visible points to test for visibility in the image. In some embodiments, selecting the plurality of the potentially visible points includes: subdividing the keyframe into sections, where each section comprises a threshold number of map points to test for visibility.

At block 325, the embodiment tests the selected plurality of the potentially visible points for visibility, wherein the testing comprises determining whether each of the plurality of the potentially visible points comprises a surrounding image patch from the keyframe that corresponds to an image patch from the 3D map. Visibility verification finds visible (non-occluded) 3D map points by for example, searching for correspondence for 3D map points and surrounding image patches in a current image or keyframe. OHCV can perform a visibility test for a selected point and image patch, and propagate (e.g., assigns the result of visible or non-visible)

the visibility result to "nearby" or "adjacent" map points and image patches. For example, points and image patches may be defined as "nearby" or "adjacent" to another point if the point is within a proximity threshold of the selected point. Proximity may be determined from points or from patches. For example, proximity may be according to a threshold number of pixels or other measurement of distance between two points, or may be determined according to whether an image patch has a threshold number of pixels that are adjacent to pixels within another neighbor image patch. In one embodiment, by pre-filtering based on depth points and the proximity optimization, a subset of the total number of 3D points and surrounding image patches may be verified and a visibility result for an image is achieved without having to verify each of the entire set of points and image patches in the image. In some embodiments, the number points and associated image patches that are the target of the visibility test is limited by a grid-scheme. For example, an image frame (e.g., input keyframe) may be divided into grids and a threshold number of visibility tests are performed relative to the number of points that fall within each grid (e.g., a grid containing 5 points may have a threshold number of 3 tests or some other number of points and threshold).

In some embodiments, the number of points to test is optimized using a grid. In one embodiment, the number of sections of the grid or a threshold number of 3D map points to test is configurable according to a processing power or reliability setting. For example, a low processing capability device may have a configuration optimized for efficiency such that the device can process keyframes fast enough to provide an adequate viewing experience for a user. A high processing capability device may have a configuration optimized for accuracy such that the device can verify additional visibility points while also providing an adequate viewing experience for a user. Visibility testing is described in greater detail below in relation to FIG. 5.

In some embodiments, testing the selected plurality of the potentially visible points for visibility further includes: propagating a result of whether each of the plurality of the potentially visible points has a corresponding point in the image, to a threshold number of points adjacent to the respective potentially visible point.

At block 330, the embodiment maps an environment according to the results of the visibility test.

In some embodiments, according to processing power of a OHCV host device (e.g., device 100) or a reliability setting, OHCV can configure according one or more of the above mentioned: number of sections to test for visibility, threshold number of potentially visible points to test, threshold number of adjacent points to propagate a visibility result, threshold number of points with depth values, or any combination thereof. For example, low processing capability devices may be configured with larger sections, resulting in a smaller number of sections to test compared to high processing capability devices. Also, irrespective of actual processing power, OHCV may be configured to perform with enhanced or reduced reliability in favor of speed by adjusting some of the configuration settings described herein.

Figure 4:
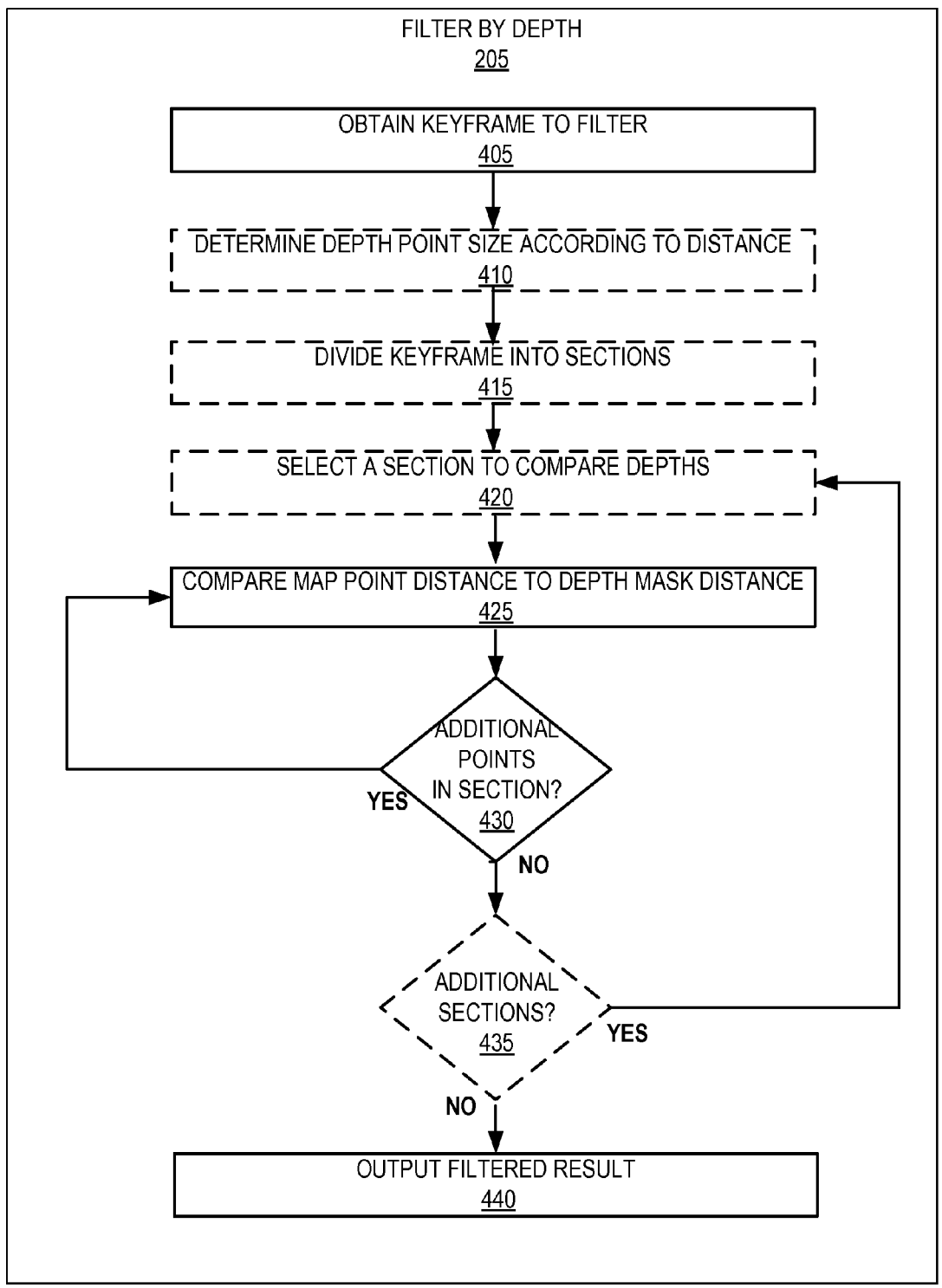
FIG. 4 illustrates a flow diagram of a method for performing OHCV Depth Filtering, in one embodiment.

FIG. 4 illustrates a flow diagram of OHCV Depth Filtering, in one embodiment. At block 405, the embodiment obtains a keyframe to filter. The keyframe may contain points (e.g., feature points) associated with elements or objects within the image. In one embodiment, in response to receiving the keyframe, the depth mask generation is initialized. For example, the obtained keyframe may be a camera view such as that illustrated in FIG. 2B.

For example, the keyframe may be processed from a camera image or video frame from a camera sensor. A keyframe may include information regarding camera viewpoint (e.g., pose) for the captured image. OHCV may extract features from an input image to create a keyframe. A feature (e.g., feature point or interest point) as used herein is as an interesting or notable part of an image. The features extracted from the captured image may represent distinct points along three-dimensional space (e.g., coordinates on axes X, Y, and Z) and every feature point may have an associated feature location. The features in keyframes either match or fail to match (i.e., are the same or correspond to) the features of previously captured keyframes. Feature detection may be an image processing operation to examine every pixel to determine whether a feature exists at a particular pixel. Feature detection may process an entire captured image or, alternatively certain portions or parts of the captured image.

For each captured image or video frame, once features have been detected, a local image patch around the feature can be extracted. Features may be extracted using a well-known technique, such as Scale Invariant Feature Transform (SIFT), which localizes features and generates their descriptions. If desired, other techniques, such as Speed Up Robust Features (SURF), Gradient Location-Orientation histogram (GLOH), Normalized Cross Correlation (NCC) or other comparable techniques may be used. When the number of extracted features for an image is determined to exceed a threshold (e.g., 100 point features or other number of points) the image and features can be saved as a keyframe.

In one embodiment, from the reconstructed (e.g., 3D map) points of the reference map (e.g., a 3D map created and maintained by a computer vision mapping system) and the 3D coordinates from the feature points, OHCV projects these points to the current camera pose (e.g., camera viewpoint associated with a current keyframe). Each keyframe point has a distance for the 2D coordinates on the image/keyframe.

At block 410, the embodiment may optionally determine depth point size according to distance. For example, FIG. 2F illustrates depth point sizing, where larger points indicate portions of the image that are closer to the camera viewpoint and smaller points indicate portions of the image that are farther from the camera viewpoint.

At block 415, the embodiment divides the keyframe with a grid. For example, the OHCV may separate the keyframe into equal sized sections for depth point calculation. In one embodiment, each section may have a configurable number of depth points.

At block 420, the embodiment selects a grid section to compare. OHCV may select a section and process points within the section before selecting a next section until all sections are processed.

At block 425, the embodiment compares map point distance to depth mask distance. As introduced above, OHCV may determine a depth mask, such as the mask illustrated in FIG. 2E or FIG. 2F. OHCV may compare distance of the 3D map point to an equivalent point in depth mask and find points that are farther than the mask pixel (e.g., occluded in the current camera pose). When OHCV determines which points are occluding, all points in a depth map may be assigned a same size (e.g. a circle with a radius of 5 pixels or some other configurable value). In some embodiments the circles may have different radius depending on their distance values. For example, smaller circles for points further away. If two points are very close but the circle of the one does not completely overdraw the other then that other point is treated as not-occluded. This may occur if both points project exactly onto the same pixel coordinate (since their circles may also have the same size). However, if there are many points then it can be that e.g. 3 points close to each other cover the whole area that another point (which is further away) would also cover. Therefore the covered point's circle is completely covered by those other 3 points and that point is then considered as occluded.

At block 430, the embodiment determines whether additional points within the current section should be processed. For example, each section may have a number of points for comparison, and OHCV may iterate through each point until a grid selection has been compared.

At block 435, the embodiment determined that a section within the grid is complete and determines whether additional sections should be compared. If additional comparisons are queued, the embodiment returns to block 320 and selects the next section for comparison. Otherwise, the embodiment continues to block 340 and outputs filtered results.

Figure 5:
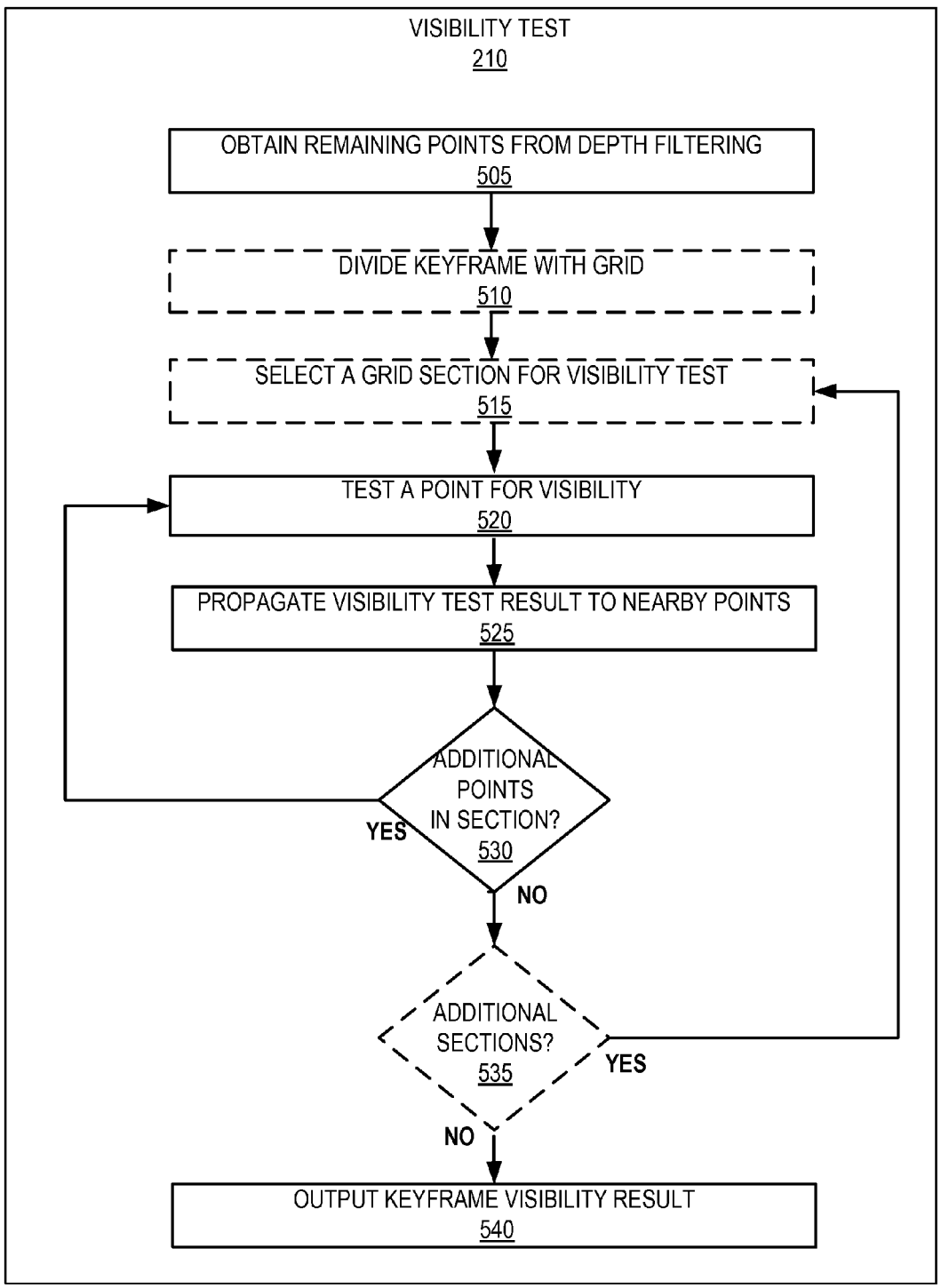
FIG. 5 illustrates a flow diagram of a method for performing OHCV Visibility Testing, in one embodiment.

FIG. 5 illustrates a flow diagram of OHCV Visibility Testing, in one embodiment. At block 505, the embodiment (e.g., OHCV) receives the remaining points from the depth filtering described in regards to FIG. 3.

At block 510, the embodiment divides the keyframe with grid. In one embodiment, OHCV enables adjustment of computation time by arranging sections to test according to sections of a grid. For each section of the grid, a configurable setting can determine how many points will be processed within the section. For example, although 1000 points may be present within a section, the configuration may set a maximum of 100 points to be processed. In one embodiment, the allowable points may be randomly distributed. In other embodiments, the allowable points to process may be well distributed across the section of the grid.

At block 515, the embodiment selects a grid section for visibility test. For example, the embodiment may iterate through each section until all sections have been tested.

At block 520, the embodiment tests a point for visibility. Each point within a section may be tested or a subsection of each point according to a configuration of the visibility test.

At block 525, the embodiment propagates visibility test result from block 420 to nearby points. For example, in response to detecting a visible point, other points close to the visible point are assumed to also be visible. Additionally, points nearby an occluded point are assumed occluded. Therefore, the visibility test is performed on a subset of all potential points to test, speeding up overall visibility testing time and lowering processor requirements.

At block 530, the embodiment determines if additional points remain for testing within the grid section. If more grid points are queued for testing within the section, the embodiment returns to block 520.

At block 535, the embodiment finishes processing a section of the grid and determines whether additional sections are queued for testing. If additional sections should be tested, the embodiment returns to block 515.

At block 540, the embodiment outputs keyframe visibility results. For example, the output may be a binary occlusion mask image.

As described above, device 100 can be a portable electronic device (e.g., smart phone, dedicated augmented reality (AR) device, game device, wearable device such as eyeglasses, or other device with AR processing and display capabilities). The device implementing the AR system described herein may be used in a variety of environments, such as shopping malls, streets, rooms, or anywhere a user may take a portable device. In an AR context, a user may use the device 100 to view a representation of the real world through the display of their device. A user may interact with their AR capable device by using their device's camera to receive real world images/video and superimpose or overlay additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

Movement of the device 100 and camera 114 can cause the display to update, in real-time, an augmentation of a target (e.g., one or more objects or scenes) in the 3D map. With movement of the device away from an initial reference image position, the device can capture additional images from alternate views. After extracting features and triangulating from additional keyframes, increased accuracy of the augmentation can be achieved (e.g., borders around an object may fit more precisely, the representation of the object in the scene will appear more realistic, and target placement can be more accurate relative to the camera 114 pose).

In one embodiment, an object or graphic may be inserted or integrated into a video stream (or image) captured by the camera 114 and displayed on display 112. OHCV may optionally prompt the user for additional information to augment the target. For example, the user may be able to add user content to augment the representation of the target. User content may be an image, 3D object, video, text, or other content type that can be integrated with, or overlaid with, or replace a representation of the target.

The display may update in real-time with seamless tracking from the original scene. For example, text on a sign may be replaced with alternate text, or a 3D object may be strategically placed in the scene and displayed on device 100. When the user changes camera 114 pose, the graphic or object can be adjusted or augmented to match the relative movement of the camera 114. For example, if a virtual object is inserted into an augmented reality display, camera movement away from the virtual object can reduce the size of the virtual object relative to the distance traveled by the camera 114. For example, taking four steps back from a virtual object should cause a greater reduction in size of the virtual object compared to taking a half step back from the virtual object, all other variables being equal. Motion graphics or animation can be animated within the scene represented by OHCV. For example, an animated object can "move" within a scene depicted in the augmented reality display. A person of skill in the art will recognize that embodiments described herein can be implemented in ways other than AR (e.g., robot positioning).

OHCV may be implemented as software, firmware, hardware, module or engine. In one embodiment, the previous OHCV description may be implemented by the general purpose processor 161 in device 100 to achieve the previously desired functions (e.g., the functions illustrated in FIG. 3, FIG. 4, and FIG. 5). In other embodiments, features of one or more of the described subcomponents may be combined or partitioned into different individual components, modules or engines.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor (e.g., processor 161), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., as illustrated in FIGS. 3-5) may be embodied directly in hardware, in a software module executed by a processor, or in a combination of the two. A software module or other program instructions may reside in Random-Access Memory (RAM), Read-Only Memory (ROM), Electrically Erasable Programmable Read-Only Memory (EEPROM), Erasable Programmable Read Only memory (EPROM), flash memory, registers, hard disk, a removable disk, a CD-ROM, DVD-ROM, Blu-Ray, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in data processing device containing hardware (e.g., hardware 162), software (e.g., software 165), firmware (e.g., firmware 163), or any combination thereof. If implemented in software as a computer program product, the functions or modules may be stored on or transmitted over as one or more instructions or code on a computer-readable media (e.g., non-transitory machine-readable storage medium). Computer-readable media can include both computer storage media and communication media including any medium or article that facilitates transfer of an executable computer program from one place to another. A storage media may be any available media that can be accessed by a computer, or data processing device/system. By way of example, and not limitation, such non-transitory computer-readable media can comprise RAM, ROM, EEPROM, EPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed am executable computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for computer vision object occlusion handling, the method comprising:
    projecting map points observable from a 3D map to points of a keyframe, wherein the keyframe comprises an image with an associated camera viewpoint;
    creating, from each of the points of the keyframe, a depth map comprising a plurality of depth map points, wherein each depth map point comprises a value representing a distance from the keyframe's associated camera viewpoint to a respective map point from the 3D map, and wherein if a depth map point represents a plurality of respective map point distances, the value comprises a smallest of the plurality of respective map point distances;
    identifying potentially visible points in the keyframe, the potentially visible points comprising the points of the keyframe having a representative distance within the depth map;
    selecting a plurality of the potentially visible points to test for visibility in the image;
    testing the selected plurality of the potentially visible points for visibility, wherein the testing comprises determining whether each of the plurality of the potentially visible points comprises a surrounding image patch from the keyframe that corresponds to an image patch from the 3D map; and
    mapping an environment according to results from the testing for visibility.

2. The method of claim 1, wherein selecting the plurality of the potentially visible points comprises:
    subdividing the keyframe into sections, and wherein each section comprises a threshold number of map points to test for visibility.

3. The method of claim 1, wherein testing the selected plurality of the potentially visible points for visibility further comprises:
    propagating a result of the testing to a threshold number of points adjacent to the respective potentially visible point.

4. The method of claim 1, wherein creating the depth map further comprises:
   subdividing the keyframe into sections, wherein a threshold number of the points with depth values are allocated to each of the sections.

5. The method of claim 1, further comprising:
   sizing the depth map point relative to the value of the point.

6. The method of claim 1, further comprising:
   configuring, according to a processing power or reliability setting: a number of sections to test for visibility, a threshold number of potentially visible points to test, a threshold number of adjacent points to propagate a visibility result, a threshold number of points with depth values, or any combination thereof.

7. The method of claim 1, wherein if the depth map point represents a plurality of respective map point distances, the largest distance represents an occluded point.

8. A device for computer vision occlusion handling comprising:
   memory; and
   a processor coupled to the memory and configured to:
   project map points observable from a 3D map to points of a keyframe, wherein the keyframe comprises an image with an associated camera viewpoint;
   create, from each of the points of the keyframe, a depth map comprising a plurality of depth map points, wherein each depth map point comprises a value representing a distance from the keyframe's associated camera viewpoint to a respective map point from the 3D map, and wherein if a depth map point represents a plurality of respective map point distances, the value comprises a smallest of the plurality of respective map point distances;
   identify potentially visible points in the keyframe, the potentially visible points comprising the points of the keyframe having a representative distance within the depth map;
   select a plurality of the potentially visible points to test for visibility in the image;
   test the selected plurality of the potentially visible points for visibility, wherein the testing comprises determining whether each of the plurality of the potentially visible points comprises a surrounding image patch from the keyframe that corresponds to an image patch from the 3D map; and
   map an environment according to results from the testing for visibility.

9. The device of claim 8, wherein the device is further configured to:
   subdivide the keyframe into sections, and wherein each section comprises a threshold number of map points to test for visibility.

10. The device of claim 8, wherein the device is further configured to:
    propagate a result of the testing to a threshold number of points adjacent to the respective potentially visible point.

11. The device of claim 8, wherein the device is further configured to:
    subdivide the keyframe into sections, wherein a threshold number of the points with depth values are allocated to each of the sections.

12. The device of claim 8, wherein the device is further configured to:
    size the depth map point relative to the value of the point.

13. The device of claim 8, wherein the device is further configured to:
    configure, according to a processing power or reliability setting: a number of sections to test for visibility, a threshold number of potentially visible points to test, a threshold number of adjacent points to propagate a visibility result, a threshold number of points with depth values, or any combination thereof.

14. The device of claim 8, wherein when the depth map point represents a plurality of respective map point distances, the largest distance represents an occluded point.

15. A machine readable non-transitory storage medium having stored therein program instructions that are executable by a processor to:
    project map points observable from a 3D map to points of a keyframe, wherein the keyframe comprises an image with an associated camera viewpoint;
    create, from each of the points of the keyframe, a depth map comprising a plurality of depth map points, wherein each depth map point comprises a value representing a distance from the keyframe's associated camera viewpoint to a respective map point from the 3D map, and wherein if a depth map point represents a plurality of respective map point distances, the value comprises a smallest of the plurality of respective map point distances;
    identify potentially visible points in the keyframe, the potentially visible points comprising the points of the keyframe having a representative distance within the depth map;
    select a plurality of the potentially visible points to test for visibility in the image;
    test the selected plurality of the potentially visible points for visibility, wherein the testing comprises determining whether each of the plurality of the potentially visible points comprises a surrounding image patch from the keyframe that corresponds to an image patch from the 3D map; and
    map an environment according to results from the testing for visibility.

16. The medium of claim 15, further comprising instructions to:
    subdivide the keyframe into sections, and wherein each section comprises a threshold number of map points to test for visibility.

17. The medium of claim 15, further comprising instructions to:
    propagate a result of the testing to a threshold number of points adjacent to the respective potentially visible point.

18. The medium of claim 15, further comprising instructions to:
    subdivide the keyframe into sections, wherein a threshold number of the points with depth values are allocated to each of the sections.

19. The medium of claim 15, further comprising instructions to:
    size the depth map point relative to the value of the point.

20. The medium of claim 15, further comprising instructions to:
    configure, according to a processing power or reliability setting: a number of sections to test for visibility, a threshold number of potentially visible points to test, a threshold number of adjacent points to propagate a visibility result, a threshold number of points with depth values, or any combination thereof.

21. The medium of claim 15, wherein when the depth map point represents a plurality of respective map point distances, the largest distance represents an occluded point.

22. An apparatus for performing occlusion handling for computer vision, the apparatus comprising:
- means for projecting map points observable from a 3D map to points of a keyframe points, wherein the keyframe comprises an image with an associated camera viewpoint;
- means for creating, from each of the points of the keyframe, a depth map comprising a plurality of depth map points, wherein each depth map point comprises a value representing a distance from the keyframe's associated camera viewpoint to a respective map point from the 3D map, and wherein if a depth map point represents a plurality of respective map point distances, the value comprises a smallest of the plurality of respective map point distances;
- means for identifying potentially visible points in the keyframe, the potentially visible points comprising the points of the keyframe having a representative distance within the depth map;
- means for selecting a plurality of the potentially visible points to test for visibility in the image;
- means for testing the selected plurality of the potentially visible points for visibility, wherein the testing comprises determining whether each of the plurality of the potentially visible points comprises a surrounding image patch from the keyframe that corresponds to an image patch from the 3D map; and
- means for mapping an environment according to results from the testing for visibility.

23. The apparatus of claim 22, wherein selecting the plurality of the potentially visible points comprises:
- means for subdividing the keyframe into sections, and wherein each section comprises a threshold number of map points to test for visibility.

24. The apparatus of claim 22, wherein testing the selected plurality of the potentially visible points for visibility further comprises:
- means for propagating a result of the testing to a threshold number of points adjacent to the respective potentially visible point.

25. The apparatus of claim 22, wherein creating the depth map further comprises:
- means for subdividing the keyframe into sections, wherein a threshold number of the points with depth values are allocated to each of the sections.

26. The apparatus of claim 22, further comprising:
- means for sizing the depth map point relative to the value of the point.

27. The apparatus of claim 22, further comprising:
- means for configuring, according to a processing power or reliability setting, one or more of: a number of sections to test for visibility, a threshold number of potentially visible points to test, a threshold number of adjacent points to propagate a visibility result, a threshold number of points with depth values, or any combination thereof.

28. The apparatus of claim 22, wherein if the depth map point represents a plurality of respective map point distances, the largest distance represents an occluded point.

* * * * *